Oct. 28, 1958   A. SMITH ET AL   2,857,728
LAWN MOWER SUPPORTING MEANS
Filed May 21, 1957
FIG. 1
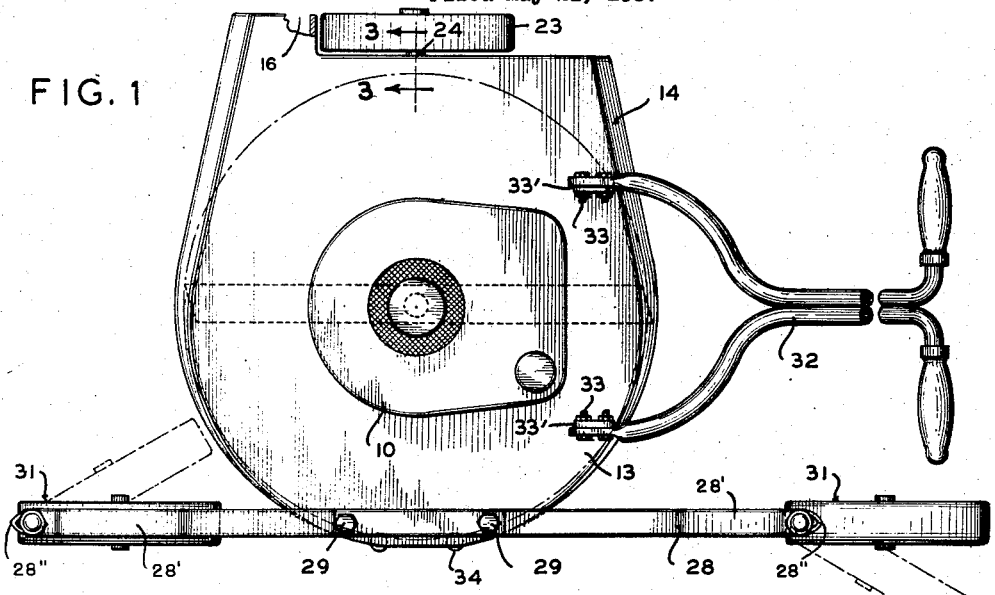
FIG. 2
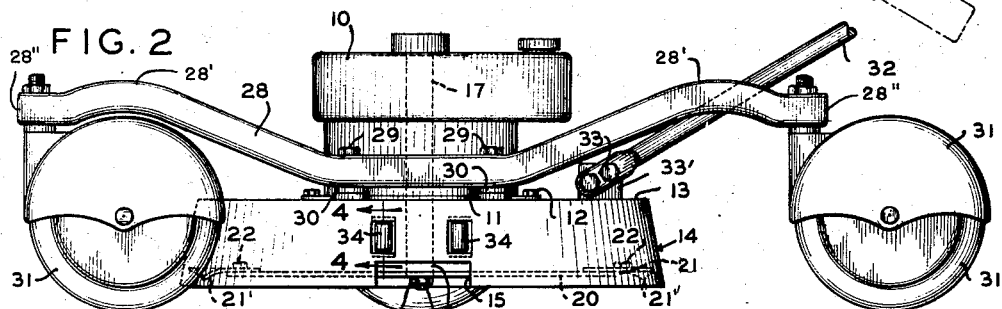
FIG. 4
FIG. 3
FIG. 6    FIG. 5
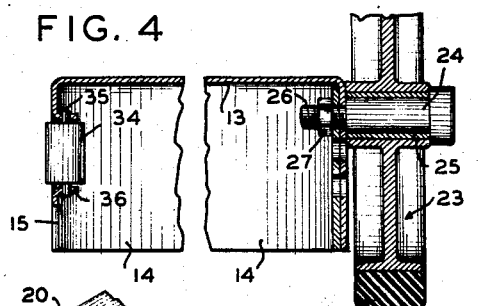
INVENTORS
B. D. BAGGS JR.
ALEXANDER SMITH
BY *Alyates Dowell I & II*
ATTORNEYS United States Patent Office 2,857,728
Patented Oct. 28, 1958

2,857,728

LAWN MOWER SUPPORTING MEANS

Alexander Smith and Burton D. Baggs, Jr., Sanford, Fla.

Application May 21, 1957, Serial No. 660,617

9 Claims. (Cl. 56—25.4)

This invention relates to landscaping including the care and cultivation of grassy areas around the home, in the field, or in other localities where trees, posts, walls, and other obstructions abound and close to which grass can be found growing and which grass requires cutting or trimming from time to time.

The invention relates particularly to machinery and equipment employed in the care of such grassy areas including that employed in the cutting, mowing or trimming of lawns and other plots where obstructions abound, where the terrain is more or less irregular and where it is desirable to give regular care to maintenance in order to provide and maintain the most attractive landscape.

Equipment used for cutting grass on lawns, under flowers and trees, near fences and walls, around posts and the like obstructions, has been of various kinds according to the particular work for which each was produced. Such equipment has been limited more or less in its use and consequently its value. Implements designed primarily for cutting grass could not be used for trimming closely around an obstruction such as bush, tree, post, wall, or the like, and implements designed for trimming were not practical for cutting grass. Lawn mowers have been constructed requiring the exercise of care in order not to scalp or remove the surface of the turf. Ownership of the many types if implements has involved large investment, particular skill, and much time in the maintaining of a lawn or the like, and has emphasized the need for a single machine which will serve many purposes.

It is an object of the invention to provide a simple and inexpensive machine, requiring no particular skill or training to use, which can be utilized for cutting grass and for trimming the edges of grassy areas and around obstructions and the like where ordinarily it has been necessary to do the work by hand.

Another object of the invention is to provide a multi-purpose lawn mower capable of being used by an unskilled person for cutting and trimming around the edges of grassy areas without scalping or removing surface turf, as well as a lawn mower so balanced that no effort will be required to cause it to travel in a relatively straight line but which is maneuverable to cut areas in substantially any desired location without skill and with minimum effort.

A further object of the invention is to provide a lawn mower having a trio of supporting wheels, one on one side and two on the other, with the latter mounted each for full rotation and with a horizontal cutter attached to a vertical shaft driven by an internal combustion engine or the like, and with a handle by means of which the guiding or maneuvering of the machine can be accomplished.

Other objects and advantages of the invention will be apparent from the following description taken in conjunction with the accompanying drawing wherein:

Fig. 1 is a top plan view illustrating one application of the invention;

Fig. 2, a side elevation;
Fig. 3, a section on the line 3—3 of Fig. 1;
Fig. 4, a section on the line of 4—4 of Fig. 2;
Fig. 5, a fragmentary perspective of one end of the cutting blade; and,
Fig. 6, a modified form illustrating an edger attachment.

Briefly stated the invention comprises a source of power such as an internal combustion engine having a vertical shaft on which is attached a transverse cutter mounted to rotate in a substantially horizontal plane in proximity to the grass to be cut. The source of power may be in the form of a small internal combustion engine having a base plate adapted to be connected to a cutter housing including a substantially horizontal body or deck with a depending flange or skirt around its margin and with such skirt having a cutter exposing opening at one side and a discharge opening at the other side for grass detached by the cutter. The cutter housing provides a deck or floor on which the source of power and the cutter are mounted and such housing is supported by a single rubber-tired wheel on a transverse axis or pivot on one side of the machine and a pair of caster wheels longitudinally disposed substantially in a straight line at the other side of the machine such caster wheels being carried by a yoke having forwardly and rearwardly extending ends and such yoke adjustably connected to the deck and with a cutter opening disposed midway between caster wheels.

With continued reference to the drawing, a source of power is provided in the form of a relatively small internal combustion engine 10, having a base plate 11, adapted to be secured by bolts 12 to a cutter housing having a substantially horizontal body portion forming a deck 13 having a substantially centrally located opening and a depending marginal flange or skirt 14.

The skirt 14 has a cutter opening 15 in one side and a somewhat larger opening 16 in the opposite side for the discharge of grass or other material cut. The motor 10 has a depending driven shaft 17 with its lower end portion located centrally within the housing 13 at substantially the same elevation as the cutter opening 15. The end portion of this shaft is provided with a reduced threaded extremity 18 and a nut 19 for securing a horizontal cutter bar 20 thereon so that when the shaft is rotating the cutter bar likewise will be rotated to perform the cutting operation. The cutter bar 20 is provided with angulardual function blade tips 21 attached by bolts 22. These blade tips 21 have their outer rear corners 21' angled downwardly to produce an upward draft of air which performs the dual function of raising the grass so that it can be engaged by the cutter and likewise causing the discharge of cut grass from the housing by the fan blade or blower action created by the upward draft of air.

Opposite the cutter opening 15 a transverse axis or pivot on one side of the skirt of the cutter housing is mounted a rubber-tired wheel 23 on a shaft 24 in an anti-friction bearing 25. This shaft has a reduced threaded end portion 26 for the reception of an attaching nut 27. This provides the necessary support for the particular side of the machine.

The opposite side of the machine in which the cutter opening is located is supported adjustably in order that the cutter 20 and the opening 15 adjacent which it rotates may be disposed at the proper elevation or distance from the earth to cut grass at the desired level. This is accomplished by means of an adjustably mounted longitudinally disposed bar or yoke 28 fastened by bolts 29 to the flat substantially circular top portion 13 of the housing. Shims or spacers 30 may be employed in accordance with the height at which it is desired that the cutter be set. In each end of the yoke 28 is mounted a caster wheel 31, the yoke being provided with arched portions 28' adjacent its extremities 28" to provide room for the caster wheels to pass therebeneath. The machine may be provided with an operating handle 32 having spaced extremities for attachment by bolts 33 with brackets 34 on the top 13 of the housing.

Adjacent each extremity of the opening 15, preferably is mounted a roller 34 on a stub shaft 35 having its extremities located in openings in struck-out portions 36 of the skirt 14 of the housing. The rollers 34 protect the machine from damage by contact with obstructions about which the grass is being cut while the cutting is being done.

If desired, the machine may be provided with an auxiliary trimmer in the form of a disc cutter 37 on a shaft 38 carrying a pulley 39 on which is mounted a belt 40 which drives a second pulley 41 on a transverse shaft 42 mounted in bearings 43 and 44 at each side of the machine. The shaft 42 carries a gear 44 which meshes with a gear 45 on the motor shaft 17 so that not only the cutter 20 but also the cutter 37 will be driven from the motor 10.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A machine for cutting and trimming grass comprising a substantially circular housing having a relatively flat body with an opening located substantially centrally therein and a depending skirt with a cutter opening located at one side and an opening for the discharge of grass at the opposite side, a power plant mounted on said housing including a drive shaft extending downwardly through the opening in said relatively flat body, a cutter mounted on the lower end of said shaft within said housing having its ends disposed angularly for producing upward flow of air in said housing to raise grass to be cut and to discharge cut grass from said housing, a wheel for supporting said housing on a transverse pivot on the side remote from said cutter opening and a longitudinally disposed support for said housing on the side in which said cutter opening is located, securing means fastening the intermediate portion of said longitudinally disposed support to said housing, spacing means between said longitudinally disposed support and the upper surface of said housing for determining the elevation of said housing, said longitudinally disposed support having arches near its extremities, and caster wheels mounted on such extremities and rotatable beneath said arches, said housing and its mounting being so balanced that the machine will travel in a straight line with minimum propulsion and can be operated to cut grass closely around an obstruction.

2. A machine for cutting and trimming grass comprising a housing having a relatively flat body with an opening therein and a depending skirt with a cutter opening located at one side and an opening for the discharge of grass at the opposite side, a power plant mounted on said housing including a drive shaft extending downwardly through the opening in said body, a cutter mounted on the lower end of said shaft within said housing having its ends disposed angularly for producing upward flow of air in said housing to raise grass to be cut and to discharge cut grass from said housing, a wheel for supporting said housing on a transverse pivot on the side remote from said cutter opening and a longitudinally disposed support for said housing on the side in which said cutter opening is located, securing means fastening the intermediate portion of said longitudinally disposed support to said housing, spacing means between said longitudinally disposed support and the upper surface of said housing for determining the elevation of said housing, said longitudinally disposed support having arches near its extremities, caster wheels mounted on such extremities and rotatable beneath said arches, said housing and its mounting being so balanced that the machine will travel in a straight line with minimum propulsion and can be operated to cut grass closely around an obstruction.

3. A machine for cutting and trimming grass comprising a housing having a relatively flat body with an opening therein and a depending skirt, a power plant mounted on said housing including a drive shaft extending downwardly through the opening in said body, a cutter mounted on the lower end of said shaft within said housing and having its ends disposed angularly for producing upward flow of air in said housing to raise grass to be cut and to discharge cut grass from said housing, a wheel for supporting said housing on a transverse pivot on one side, longitudinally disposed supporting means for said housing, securing means attaching said longitudinally disposed supporting means to said housing, spacing means between said longitudinally disposed supporting means and the upper surface of said housing for determining the elevation of said support and said housing from the earth, and caster wheels mounted on said longitudinally disposed supporting means, said housing and its mounting being so balanced that the machine will travel in a straight line with minimum propulsion and can be operated to cut grass closely around an obstruction.

4. In a machine for cutting and trimming grass, a housing, a cutter in said housing and having its ends disposed angularly for producing upward flow of air in said housing to raise grass to be cut and to discharge cut grass from said housing, a wheel supporting said housing on a transverse pivot on one side, a longitudinally disposed support for said housing, securing means attaching said longitudinally disposed support to said housing, spacing means between said housing and said longitudinally disposed support for determining the elevation of said support and said housing from the earth, and caster wheels mounted on said longitudinally disposed support, said housing and its mounting being so balanced that the machine will travel in a straight line with minimum propulsion and can be operated to cut grass closely around an obstruction.

5. In a machine for cutting and trimming grass, a housing, a cutter mounted in said housing and having means for producing an upward flow of air in said housing to raise grass to be cut and to discharge cut grass from said housing, means for supporting said housing on a fixed transverse pivot on one side and multiple swivel ground engaging means disposed in longitudinal alignment for supporting said housing on the other side, a longitudinally disposed support attaching said swivel ground engaging means to said housing, spacing means between said longitudinally disposed support and said housing for determining the elevation of said cutter from said earth, said housing and its mounting being so balanced that the machine will travel in a straight line with minimum propulsion and can be operated to cut grass closely around an obstruction.

6. In a machine for cutting and trimming grass, a housing, a cutter mounted in said housing and having means for producing an upward flow of air in said housing to raise grass to be cut and to discharge cut grass from said housing, means for supporting said housing on a fixed transverse pivot on one side and multiple swivel ground engaging means disposed in longitudinal alignment for supporting said housing on the other side, spacing means on said housing for determining the elevation of said cutter from said earth, said housing and its mounting being so balanced that the machine will travel in a straight line with minimum propulsion and can be operated to cut grass closely around an obstruction.

7. In a machine for cutting and trimming grass, a housing, a cutter mounted in said housing, a wheel attached to said housing on a fixed transverse pivot on one side and a pair of caster wheels disposed in substantially longitudinal alignment carried by said housing on the opposite side thereof, said housing and wheels being so balanced that the machine will travel in a straight line with minimum propulsion and can be operated to cut grass closely around an obstruction.

8. In a machine for cutting and trimming grass, a body, a cutter mounted to rotate in a horizontal plane in said body, a wheel mounted on a fixed transverse pivot attached to said body on one side, a pair of pivoted wheels disposed in substantial alignment and carried by said body on the opposite side, spacing means carried by said body and adjustable to vary the distance of said body and cutter from the ground, said wheels being so attached that the machine will travel in a straight line with minimum propulsion and can be operated to cut grass closely around an obstruction.

9. A device of the character described comprising a housing, an implement mounted within said housing, multiple ground engaging wheels supporting said housing, said multiple ground engaging wheels including a wheel on a fixed transverse pivot located on one side of the housing and a pair of caster wheels disposed substantially in longitudinal alignment and located on the opposite side of said housing.

References Cited in the file of this patent

UNITED STATES PATENTS

| | | |
|---|---|---|
| 2,143,057 | Danielson | Jan. 10, 1939 |
| 2,263,368 | Sejkora | Nov. 18, 1941 |
| 2,564,201 | Hainke | Aug. 14, 1951 |
| 2,719,396 | Morris et al. | Oct. 4, 1955 |

FOREIGN PATENTS

| | | |
|---|---|---|
| 596,283 | Great Britain | Dec. 31, 1947 |
| 1,073,832 | France | Mar. 24, 1954 |